US006370525B1

(12) United States Patent
Kaufman

(10) Patent No.: US 6,370,525 B1
(45) Date of Patent: Apr. 9, 2002

(54) METHOD AND SYSTEM FOR RETRIEVING RELEVANT DOCUMENTS FROM A DATABASE

(75) Inventor: Ilia Kaufman, Toronto (CA)

(73) Assignee: KCSL, Inc., Toronto (CA)

( * ) Notice: Subject to any disclaimer, the term of this patent is extended or adjusted under 35 U.S.C. 154(b) by 0 days.

(21) Appl. No.: 09/711,460

(22) Filed: Nov. 13, 2000

Related U.S. Application Data

(62) Division of application No. 09/502,186, filed on Feb. 10, 2000, now Pat. No. 6,240,408, which is a continuation of application No. PCT/CA99/00531, filed on Jun. 7, 1999
(60) Provisional application No. 60/088,483, filed on Jun. 8, 1998.

(51) Int. Cl.[7] ............................................... G06F 17/30
(52) U.S. Cl. ............................................... 707/3; 707/5
(58) Field of Search ......................................... 707/1–6

(56) References Cited

U.S. PATENT DOCUMENTS 5,576,954 A * 11/1996 Driscoll ........................ 707/3
5,659,732 A    8/1997 Kirsch ......................... 395/605
5,694,592 A   12/1997 Driscoll ....................... 395/603
5,893,092 A *  4/1999 Driscoll ........................ 707/5
6,088,692 A *  7/2000 Driscoll ........................ 707/3
6,240,408 B1 * 5/2001 Kaufman ....................... 707/3

FOREIGN PATENT DOCUMENTS

EP          0 304 191          2/1989

* cited by examiner

*Primary Examiner*—Maria N. Von Buhr
(74) *Attorney, Agent, or Firm*—Foley, Hoag & Eliot, LLP

(57) ABSTRACT

A method for processing a search query uses the results of a search performed on a high quality, controlled database to assess the relevance of documents retrieved from a search of an uncontrolled public database having documents of highly variable quality. The method includes the steps of parsing the search query and then searching the authoritative database to generate authoritative database results. The search query is also used to search the public database, thereby generating public database results. The quality or relevance of the public database results are then quantified on the basis of the authoritative database results, thereby generating a quality index. The results from both the authoritative and the public databases are then ranked on the basis of this quality index.

47 Claims, 4 Drawing Sheets

METHOD AND SYSTEM FOR RETRIEVING RELEVANT DOCUMENTS FROM A DATABASE

This application is a Div. of Ser. No. 09/502,186 filed Feb. 10, 2000 U.S. Pat. No. 6,240,405 which is a continuation of PCT/CA99/00531 filed Jun. 7, 1999 which claims benefit of Prov. No. 60/088,483 filed Jun. 8, 1998.

BACKGROUND

For most users, a search of a database for documents related to a particular topic begins with the formulation of a search query for use by a search engine. The search engine then identifies documents that match the specifications that the user sets forth in the search query. These documents are then presented to the user, usually in an order that attempts to approximate the extent to which the documents match the specifications of the search query.

In its simplest form, the search query might be no more than a word or a phrase. However, such simple search queries typically result in the retrieval of far too many documents, many of which are likely to be irrelevant. To avoid this, search engines provide a mechanism for narrowing the search, typically by allowing the user to specify some Boolean combination of words and phrases. More complex search queries allow a user to specify that two Boolean combinations be found within a particular distance, usually measured in words, from each other. Known search queries can also provide wildcard characters or mechanisms for including or excluding certain word variants.

Regardless of its complexity, a search query is fundamentally no more than a user's best guess as to the distribution of alphanumeric characters that is likely to occur in a document containing the information of interest. The success of a search query thus depends on the user's skill in formulating the search query and in the predictability of the documents in the database. Hence, a search query of this type is likely to be most successful when the documents in the database are either inherently structured or under editorial control. Because of the necessity for thorough editorial review, such databases tend to be either somewhat specialized (for example databases for patent searching or searching case law) or slow to change (for example, CD-ROM encyclopedias).

Because of its distributed nature, the internet offers a breadth of up-to-date information. However, documents posted on the internet are often posted with little editorial control. As a result, many documents are plagued with inconsistencies and errors that reduce the effectiveness of a search engine. In addition, because the internet has become an advertising medium, many sites seek to attract visitors. As a result, proprietors of those sites pepper their sites with invisible (to the reader) words, as bait for attracting the attention of search engines. The presence of such invisible words thwarts the search engine's attempt to judge the relevancy of a document solely by the distribution of words in the document.

The unreliability associated with many documents on the internet poses a difficult problem when a search engine attempts to rank the relevance of retrieved documents. Because all the search engine knows is the distribution of words, it can do no more than indicate that the distribution of words in a document does or does not match the search query more closely than the distribution of words in another document. This can result in such a prolixity of search results that it is impractical to examine them all. Moreover, because there is no absolute standard for relevance on the internet, there is no assurance that the most highly ranked document returned by a search engine is even relevant at all. It may simply be the least irrelevant document in a collection of irrelevant documents.

Attempts have been made to improve the searchability of the internet by having human editors assess the reliability and relevance of particular sites. Addresses to those sites meeting a threshold of reliability are then provided to the user. For example, major publishers of encyclopedias on CD-ROM provide pre-selected links to internet sites in order to augment the materials provided on the CD-ROM. However, these attempts are hampered by the fact that internet sites can change, both in content and in address, overnight. Thus, a reviewed site that may have existed on publication of the CD-ROM may no longer exist when a user subsequently attempts to activate that link.

It is apparent that the dynamic and free-form nature of the internet results in a highly diversified and current storehouse of reference materials. However, the uncontrolled nature of documents on the internet results in an environment that is not readily searchable in an efficient manner by a conventional search engine.

SUMMARY

In accord with the method and apparatus of this invention, the relevance of documents retrieved by a search engine operating in an uncontrolled public database is considerably improved by also searching a controlled database, and by using the search results from the controlled database to assess the relevance of the documents retrieved from the public database.

The method of the invention includes the identification and ranking of a plurality of candidate documents on the basis of the similarity of each of the candidate documents to a user-query.

This method includes the step of parsing the user-query to generate both a list of one or more query-words and a distribution, within the user-query, of the query-words in that list. The user-query can be provided by the user or it can be an excerpt of text selected from a document referred to by the user.

The importance of each query-word in the user-query is then assessed on the basis of the frequency with which the query-word occurs in a database of candidate documents. In an optional feature of the invention, the step of parsing the query includes the step of providing additional query-words, referred to as derivative query-words, which are associated with the original query-words provided by the user. These derivative query-words are accorded lesser importance in the identification of candidate documents than are original query-words.

A candidate document that has clusters of query-words is intuitively of more relevance to a user-query than is a candidate document with isolated occurrences of query-words. The former is likely to contain a coherent discussion of the subject matter of the user-query whereas the latter may refer to the subject matter of the user-query only tangentially. In some cases, an isolated occurrence of a query-word may be no more than a typographical error.

The method of the invention exploits the importance of query-word clustering to the identification of candidate documents similar, or relevant, to a user-query by evaluating the similarity of a candidate document to the user-query on the basis of the distribution, or clustering, of query-words within the particular candidate document. In a preferred embodiment, the step of evaluating this measure of document similarity, referred to as a "document conductance," includes the step of determining the concentration, or distribution, of query-words in the candidate document. A document in which there exist regions of high concentration, or clustering, of query-words is indicative of a document that is similar to the query. Such a candidate document is therefore assigned a document conductance indicative of greater similarity to the user-query than a candidate document having fewer such query-word clusters.

Having evaluated the similarity of a large number of candidate documents to the user-query, the method of the invention now proceeds with an evaluation of the distribution, or clustering, of the query-words in the individual sentences that make up the candidate document. The similarity of a particular sentence to the user-query depends upon the concentration of query-words in a particular sentence.

In one preferred embodiment, the similarity of a particular sentence is measured by a quantity that is responsive to, or depends upon, the ratio of the overall concentration of the query-word in the plurality of candidate documents to the concentration of the query-word in the sentence. Where there are several query-words, this quantity, which is referred to as the "position-independent sentence similarity," is summed over all query-words occurring in the particular sentence.

The location, within a document, of a sentence containing one or more query-words is potentially indicative of the importance or relevance of that document. In particular, if a sentence having one or more query-words is located near the beginning of the document, that sentence may be part of an introduction that sets forth, using a relatively small number of words, the general subject matter of the document. Conversely, if a similar sentence is located near the end of the document, it may be part of a concluding section that recapitulates the main points of the document.

In an optional feature of the invention, documents containing such content-rich text are identified by assigning a quantity to the sentences making up the candidate document that depends on the position of the sentence within the document. This quantity,referred to as the "position-dependent sentence similarity," is obtained by weighting the contribution made by each sentence to the calculation of the position-independent sent similarity by a quantity that depends on the position of the particular sentence within the document.

Candidate documents derived from a public database such as the internet are often not subject to stringent editorial review. Thus, in searching such a public database for candidate documents similar, or relevant, to a user-query, it is advantageous to provide an authoritative database to use as a standard against which the similarity of candidate documents from the public database is assessed. Such a database typically includes a multiplicity of reference materials published only after having been subjected to editorial scrutiny.

In one method according to the invention, candidate documents are identified in both an authoritative database and in a public database. In this method, the foregoing steps are applied to both candidate documents from the authoritative database and candidate documents from the public database. The resulting search results include documents from both the public database and the authoritative database.

These and other aspects of the invention will be apparent from the following detailed description and the associated figures in which.

DETAILED DESCRIPTION

Figure 1:
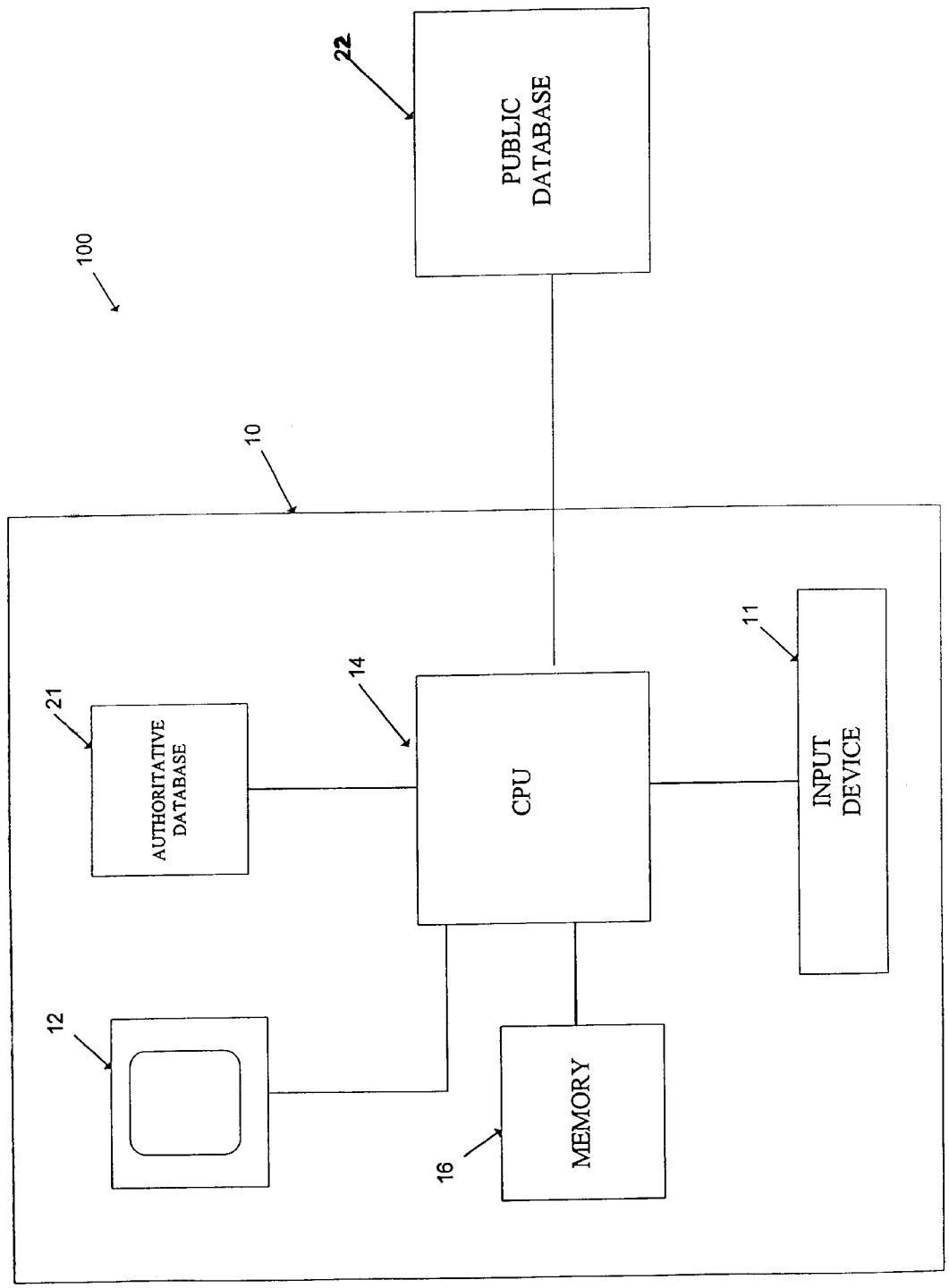
FIG. 1 is a data processing system connected to both a public database and to an authoritative database in accord with the principles of the invention.

Referring to FIG. 1, a data processing system 100 embodying the invention includes a computer system 10 linked to an authoritative database 21 and to a public database 22.

Figure 2:
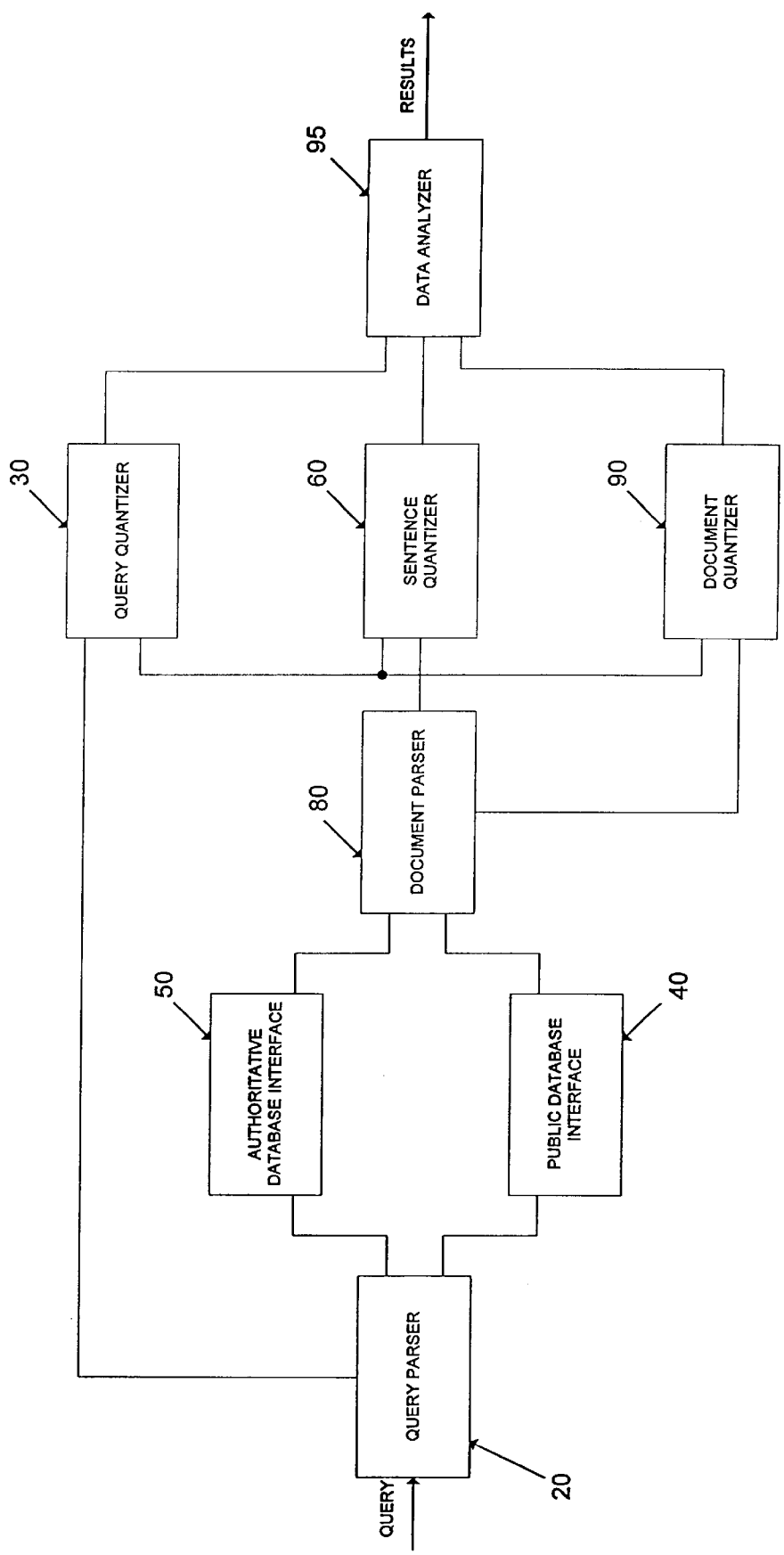
FIG. 2 is a block diagram of the architecture of the software executed by the computer system shown in FIG. 1.

The authoritative database 21 includes a large number of documents selected to be reference materials of high reliability. Examples of documents suitable for inclusion in the authoritative database 21 include encyclopedias, almanacs, dictionaries and other reference materials by reputable publishers and subject to professional editorial review. The authoritative database 21 can be stored on a CD-ROM as illustrated in FIG. 2, or on other non-volatile storage media located either locally or remotely. The authoritative database can, for example, be accessible through the internet.

In contrast to the authoritative database 21, the public database 22 includes a very large number of documents of unknown reliability. These documents can change in both number and content from day to day. Because documents can be freely published on the public database 22, there is no guarantee that such documents undergo even minimal editorial scrutiny. Documents in the public database 22 can include materials other than reference materials. For example, the public database 22 can include advertising materials, works of fiction, pornographic materials, and other documents that are likely to be irrelevant. An example of such a public database is the internet, and, in particular, the collection of HTML documents that make up the world-wide-web.

The computer system 10 includes one or more input devices 11, typically a keyboard operating in conjunction with a mouse or similar pointing device, for communicating queries and other instructions from a user to a main processor 14. The main processor 14 is coupled to run executable software loaded into a memory element 16 and to display output on a display terminal 12.

The overall architecture of the executable software for implementing one preferred embodiment of the invention is summarized in FIG. 2. The illustrated software implements a query parser 20 that is in communication with: (i) a query quantizer 30, (ii) a first interface 50 for allowing the main processor 14 to communicate with the authoritative database 21, and (iii) a second interface 40 for allowing the main processor 14 to communicate with the public database 22.

The query parser 20 accepts a user-query from a user. Alternatively, the user can select text from a selected document and designate that selected text to be the user-query. The selected document can be either identified by the user or identified by a search engine as a result of an earlier search by the user.

The user-query is a string of characters representative of one or more sentences, each of which includes one or more query-words. A query-word can occur one or more times in a sentence and can also occur in one or more sentences.

In operation, the query parser 20 first determines the location of word boundaries and sentence boundaries in the user-query. Because certain commonly occurring words (for example "the," "a," "an") are unlikely to yield relevant material in a search, the query parser ignores these words. The result of this procedure is a set of query-sentences, each of which is a set of original query-words. The term "original" is used to indicate that the query-words are supplied by the user. The query parser 20 then makes this set of query-sentences available to the query quantizer 30.

In addition to generating the set of query-sentences, the query parser 20 also forms a list of all distinct query-words used in the query. In an optional, but highly desirable implementation, the query parser 20 adds grammatical variants of the query-words to this list of distinct query-words. For example, the word "walk" in the query list may result in the inclusion of such variants as "walking" and "walked." Similarily "tire" may result in the inclusion of "tyre." The query parser 20 likewise makes the resulting set of distinct query-words available to the query quantizer 30.

In a preferred but nevertheless optional feature of the invention, the query parser 20 augments the list of original query-words with a list of derivative query-words. For example, if the query parser 20 identifies the word "car" in a user-query, it may add the word "automobile" to the list of query-words. These derivative query-words need not be synonymous with the original query-words but can also be words that one would reasonably expect to find in a document containing the original query-word. For example, if the original query-word were "diabetes," a derivative query-word might be "insulin." These derivative query-words are treated the same way as the original query-words supplied by the user with the exception that they are accorded less weight in the relevance ranking procedure.

The search for relevant documents includes two steps: a search for relevant documents in the public database 22 and a search for relevant documents in the authoritative database 21. The query parser 20 initiates both these steps by transmitting search instructions to the first interface 50 and to the second interface 40.

The query parser 20 translates the user-query into a first instruction set suitable for searching the authoritative database 21 for relevant documents and makes this first instruction set available to the first interface 50. In response to this first instruction set, the first interface 50 retrieves relevant documents from the authoritative database 21 and makes those documents available to a document parser 80. Each document retrieved from the authoritative database 21 in this manner includes one or more of the query-words.

The query parser 20 also translates the user-query into a second instruction set suitable for searching for relevant documents in the public database 22. This second set of instructions is then made available to the second interface 40. In the case of a public database 22 such as the internet, the actual search is performed by a user-definable set of search engines. Thus, in response to the receipt of this second instruction set, the second interface 40 generates several sets of search instructions, one for each of the publicly available search engines pre-defined by the user. Each of these several sets of search instructions is in a syntax appropriate for the particular search engine with which it is to be used. The pre-selected search engines identify candidate documents from the public database 22. The resulting list of candidate documents is then used to retrieve the identified candidate documents and make them available to the document parser 80. It will be appreciated that the search of the public database 22 and the search of the authoritative database 21 proceed independently of each other and that, consequently, these two searches can be performed concurrently.

For each candidate document, whether it is retrieved from the public database 22 or the authoritative database 21, the document parser 80 identifies boundaries between words and sentences. Thus, for each candidate document, the document parser 80 generates an ordered set of sentences. Each sentence is a set whose elements are the words found in that sentence. These sets of sentences are then supplied to a document quantizer 90 and to a sentence quantizer 60.

In addition to initiating the search, the query parser 20 provides the query-words and the query-sentences to the query quantizer 30. The function of the query quantizer 30 is to assess the importance of each query-word in the user-query by examining the distribution of that query-word in the sentences of the user-query. The query quantizer 30 operates under three assumptions: (i) that a query-word that occurs only rarely in a collection of documents is more important than a query-word that occurs frequently throughout the collection of documents; (ii) that a query-word that only occurs once in a query is less important than a query-word that occurs several times in the query; and (iii) that a query-word that is one of many distinct query-words in a sentence is more important than a query-word that is one of only a few distinct words in the sentence. The query quantizer 30 calculates two quantities: an "inverse document frequency" that reflects the first assumption, and a "query-word-conductance" that reflects the second and third assumptions.

To calculate the inverse document frequency for a particular query-word, the query quantizer 30 counts the number of occurrences of the query-word in a collection of documents. Because the documents in the public database 22 are so numerous, constantly changing, and of unknown reliability, the query quantizer 30 of the preferred embodiment counts the occurrences of the query-word in the documents from the authoritative database 21.

In one preferred embodiment, the inverse document frequency is given by the base 2 logarithm of the ratio of the total number of documents in the authoritative database 21 to the number of documents in the authoritative database 21 in which the query-word occurs at least once. If the query-word does not occur at all in the authoritative database 21, the method of the invention considers there to be one document in the authoritative database 21 that includes that query-word. This both prevents the query quantizer 30 from dividing by zero and also reflects the importance of the query word.

To calculate the query-word-conductance, the query quantizer 30 assigns a score to each sentence in the query and then adds together the scores of all the sentences in the query. The resulting sum is the query-word-conductance.

The score assigned to each sentence depends upon the number of sentences that contain the query-word and on the number of distinct query-words in each of those sentences.

For each sentence in the query, there are three possibilities: the query-word is the only distinct word in that sentence; the query-word is one of several words in that sentence; or the query-word is not present in that sentence.

If the query-word is the only distinct word in the sentence, then the score for that sentence is ½, regardless of the number of times the query-word occurs in that one sentence. If the query-word is one of many distinct words in a sentence, then the score for that sentence is the number of distinct words in that sentence. If the query-word does not occur in the sentence, the score for that sentence is zero.

The scores assigned to a sentence are weighted by a scaling factor SF when the query-word is not an original query-word supplied by the user but is, instead, a derivative query-word supplied by the query parser 20. This scaling factor is empirically determined and depends on the choice of documents in the authoritative database 21. In one preferred embodiment, SF is chosen to be equal to 4. The score assigned to a sentence in which a derivative query-word, rather than an original query-word, is found is the score the sentence would have received had the derivative query-word been an original query-word, but multiplied by the factor 1/SF. Hence, in the preferred embodiment, a derivative query-word counts for only one-fourth as much as an original query-word.

Figure 3:
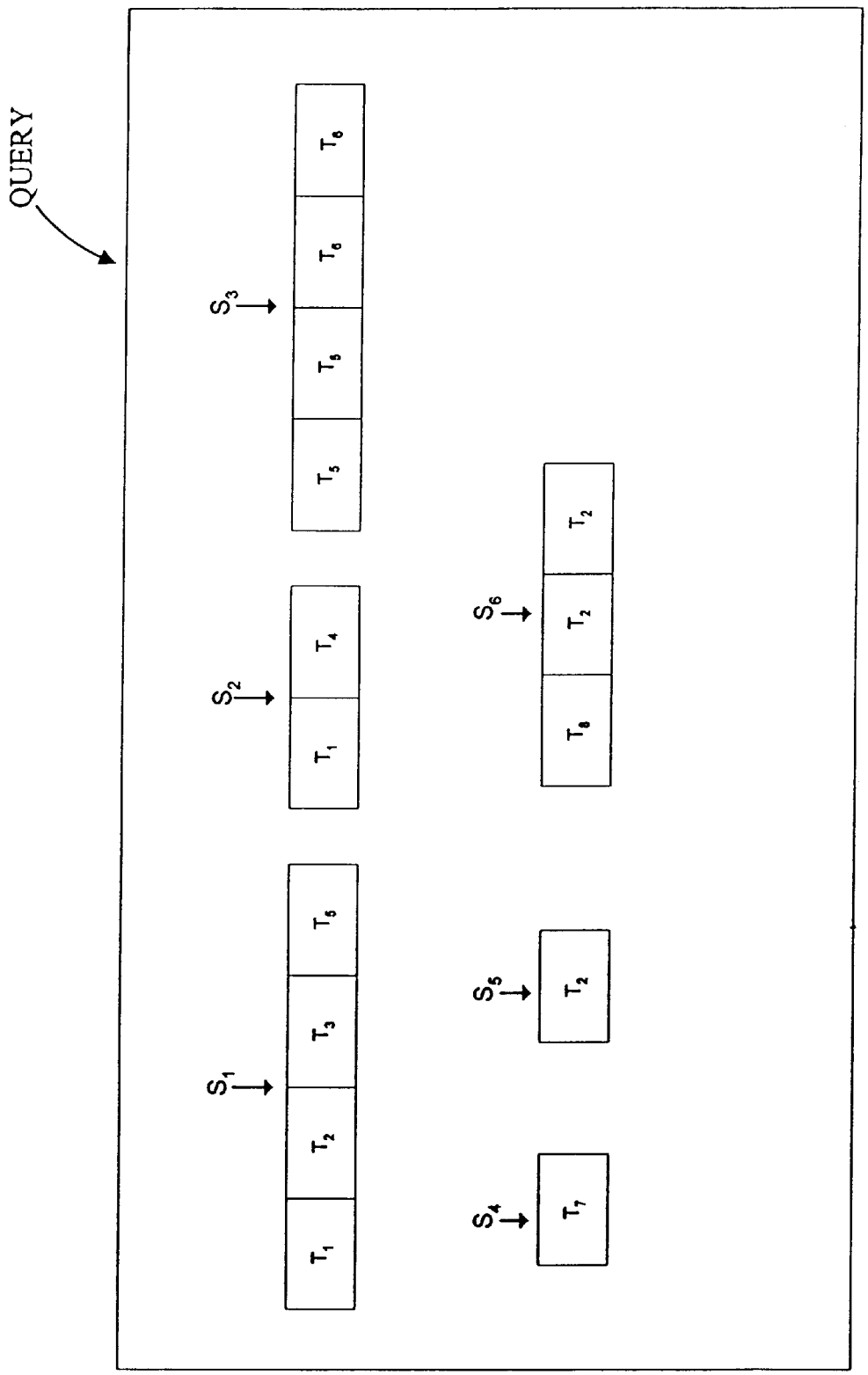
FIG. 3 illustrates the method used by the query quantizer of FIG. 2 in evaluating a user-query.

The calculation of query-word-conductance is illustrated in FIG. 3 for a representative query in which eight distinct query-words $\{t_1, t_2, \ldots t_8\}$ are distributed among six sentences $\{S_1, S_2 \ldots S_6\}$. Because there are eight distinct query-words, there are eight query-word-conductances to be calculated.

The first query-word, $t_1$, occurs in the first and second sentences, $S_1$ and $S_2$. The score for the first sentence is 4 because there are four distinct query-words in that sentence. Similarly, the score for the second sentence is 2 because there are two distinct query-words in that sentence. The scores for the remaining sentences are zero because the first query-word is not present in those sentences. The query-word-conductance for the first query-word t, is thus 4 +2, or 6.

The second query-word, $t_2$, occurs in only the first sentence. Since the first sentence has four distinct query-words, the score assigned to that sentence is 4. The remaining sentences contribute nothing to the query-word-conductance. Hence, the query-word-conductance for the second query-word is 4.

The fourth query-word, $t_4$, like the second query-word, also occurs in only one sentence, namely the second sentence. However, this sentence contains only two distinct query-words. Hence the score assigned to this sentence is 2. Since the remaining sentences contribute nothing, the query-word-conductance for the fourth query-word is 2.

The fact that it is the number of distinct words that matters is made apparent in the calculation of the query-word-conductance for the fifth query-word, $t_5$. The fifth query-word occurs twice in the third sentence. However, the third sentence has only two distinct query-words, $t_5$ and $t_6$. Hence, despite the fact that this sentence contains five words, the score assigned to this sentence is only 2. Since no other sentence includes the fifth query-word, the query-word-conductance for the fifth query-word is 2.

The interplay of these rules is illustrated in the query-word-conductance calculation for the sixth query-word, $t_6$. The sixth query-word occurs twice in the third sentence and once in the first sentence. Because there are only two distinct query-words in the third sentence, the score for that sentence is 2. The first sentence, however, has four distinct query-words. As a result, its score is 4. The query-word-conductance for the sixth query-word is thus 6.

The seventh query-word, $t_7$, occurs only in the fourth sentence. Because the seventh query-word is the only word in the fourth sentence, the score for the fourth sentence is ½. Since no other sentences include the seventh query-word, the query-word-conductance for the seventh query-word is ½.

The eight query-word, $t_8$, occurs three times in the sixth sentence. However, because the eighth query-word is the only distinct word in the sixth sentence, the score assigned to the sixth sentence is ½. Since no other sentence includes the eighth query-word, the query-word-conductance for the eighth query-word is also ½.

The second query-word, $t_2$, occurs once in the first sentence and once, by itself, in the fifth sentence. The score assigned to the first sentence is thus 4 because there are four distinct words in that sentence. The score assigned to the fifth sentence is ½ because the second query-word is the only distinct word in that sentence. The query-word-conductance for the second word is thus 4 ½.

Each candidate document provided by the document parser 80, whether it is retrieved from the public database 22 or from the authoritative database 21, is a sequence of one or more sentences, each having one or more words. The function of the document quantizer 90 is to use the distribution or clustering of query-words in the sentences of the document to assess whether that document is relevant to the query. The document quantizer 90 operates under two assumptions: that clusters of query-words, or regions of high query-word concentration, suggest documents of great relevance; and that isolated occurrences of query-words, or regions of very low query-word concentration, are indicative of lexical noise. These two assumptions are reflected by a quantity referred to as the "document-conductance."

To calculate the document-conductance, the document quantizer 90 assigns a score to each sentence in the document on the basis of whether that sentence includes a query-word and on the basis of the distance to the closest sentence that also includes that query-word or any other query-word. The document quantizer 90 then sums these scores to generate the document-conductance.

In assigning a score to a particular sentence in a document, the document quantizer 90 considers three possibilities: the sentence does not include a query-word; the sentence includes only a single query-word; and the sentence includes several occurrences of a query-word.

Clearly, a sentence in which the query-word does not occur at all suggests that the document is not relevant to the query. For this reason, if the query-word does not occur at all in the sentence, the document quantizer 90 assigns that sentence a score of zero.

A sentence in which a query-word occurs multiple times or in which there exist several query-words suggests a discussion relevant to the subject matter of the user-query. A document having many such sentences is thus likely to be a highly relevant document. For this reason, when a query-word occurs more than once in a sentence or when a sentence includes several query words, the document quantizer 90 assigns that sentence a score equal to the number of distinct occurrences of a query-word in that sentence.

A sentence in which a query-word occurs only once presents a more difficult problem. The occurrence may represent a spurious and isolated use of the query-word, or perhaps even a typographical error resulting in the inadvertent inclusion of the query-word in the document. On the other hand, the occurrence may also be in the context of a highly relevant discussion on the subject matter of the query-word by an author who simply prefers to use shorter sentences.

In order to distinguish between these two cases, the document quantizer 90 considers the gaps between the occurrences of query-words. If the query-word occurs only once in a particular sentence, the document quantizer 90 searches the sentences that come before and after that particular sentence for the next occurrence of any query-word. The document quantizer 90 then assigns the particular sentence a score that is high when the nearest occurrence is nearby and lower when the nearest occurrence is far away. In the preferred embodiment, the score is the reciprocal of the minimum number of sentences that spans the query-word in the particular sentence and at least one additional occurrence of a query-word. This minimum number accounts for the particular sentence containing the query-word, the sentence containing the nearest occurrence of a query-word, as measured from the particular sentence, and any sentences between these two sentences.

The scores assigned to a sentence are weighted by a scaling factor SF when the query-word is not an original query-word supplied by the user but a derivative query-word supplied by the query parser 20. This scaling factor is empirically determined and depends on the choice of documents in the authoritative database 21. In the preferred embodiment, SF is chosen to be equal to 4. The score assigned to a sentence in which a derivative query-word, rather than an original query-word, is found is the score the sentence would have received had the derivative query-word been an original query-word, but multiplied by the factor 1/SF. Hence, in the preferred embodiment, a derivative query-word counts for only one-fourth as much as an original query-word.

Figure 4:
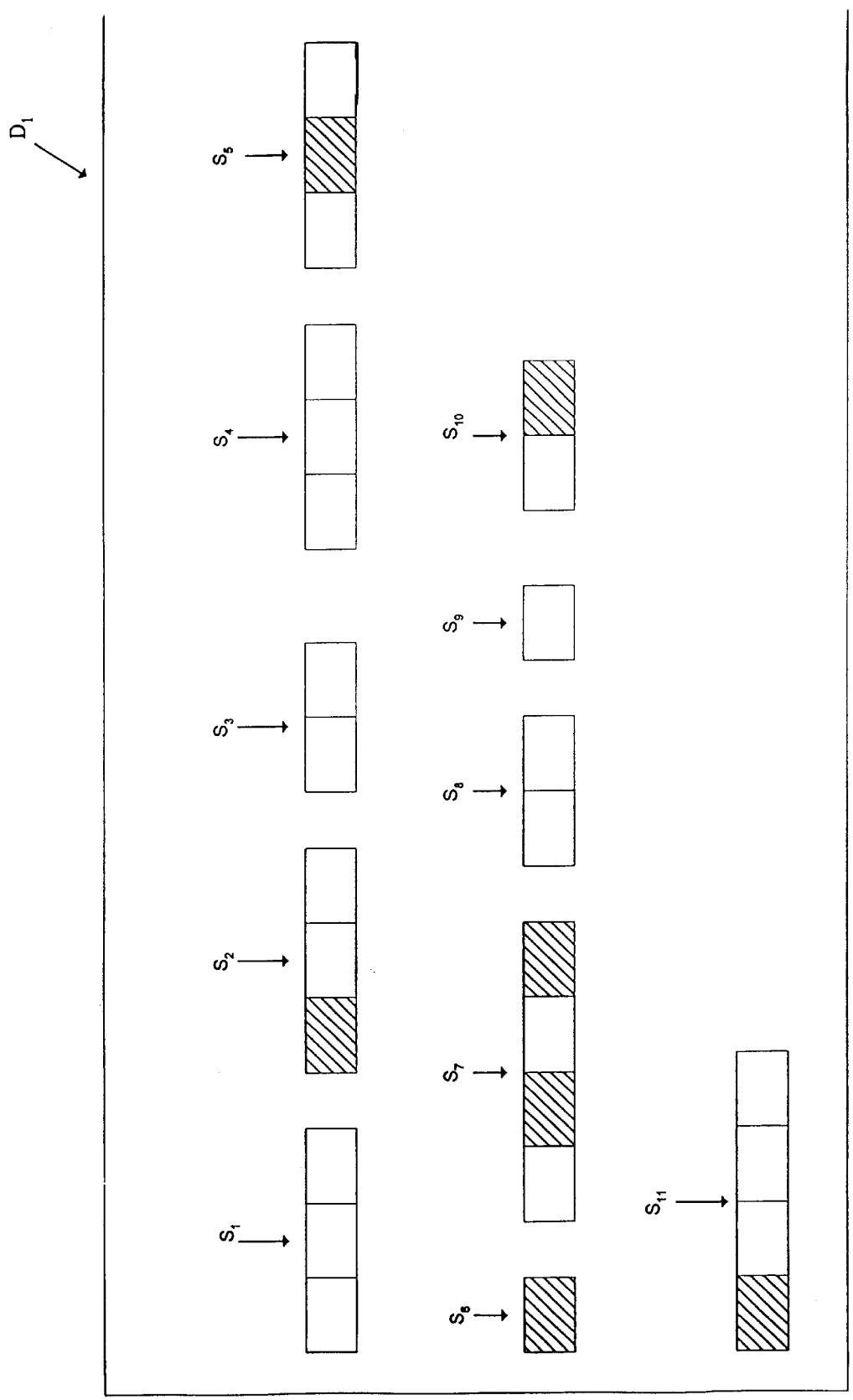
FIG. 4 illustrates the method used by the document quantizer of FIG. 2 in evaluating a candidate document.

FIG. 4 illustrates the application of the foregoing scoring procedure to a document shown schematically as having eleven sentences with varying numbers of words. In the figure, each sentence is represented as a narrow horizontal bar divided by vertical lines into one or more segments representing individual words. The presence of a query-word in a particular sentence is indicated by a shaded segment. To facilitate discussion, the sentences are labeled $S_1$ through $S_{11}$.

To generate the document-conductance for the document illustrated in FIG. 4, the document quantizer assigns a score to each sentence. Sentences $S_1$, $S_3$, $S_4$, $S_8$, and $S_9$ do not contain any query-word. Hence, the document quantizer assigns these five sentences a score of zero. Sentence $S_7$ contains two query-words, so its score is 2.

The fifth sentence, $S_5$, has only one query-word. As a result, the document quantizer searches for the closest occurrence of a query-word. These are the query-word in $S_2$ and the query-word in $S_6$. Of these, the query-word in $S_6$ is closer. The assigned score is thus ½, which is the reciprocal of the minimum number of sentences (2) that spans the query-word in $S_5$ and at least one additional query-word.

The document quantizer considers the first sentence of the document to be adjacent to the last sentence of the document. Thus, in assigning a score to the first second sentence, which contains one occurrence of a query-word, the document quantizer considers the two nearest query-words to be in $S_5$ and in $S_{11}$. Of these, the closer one is the one in $S_{11}$. As a result, the document quantizer assigns a score of ⅓ to $S_2$. The table below summarizes the scores assigned to the eleven sentences in the document of FIG. 4:

| Sentence | Score |
|---|---|
| 1 | 0 |
| 2 | 1/3 |
| 3 | 0 |
| 4 | 0 |
| 5 | 1/2 |
| 6 | 1/2 |
| 7 | 2 |
| 8 | 0 |
| 9 | 0 |
| 10 | 1/2 |
| 11 | 1/2 |

The conductance for the document shown in FIG. 4 is thus the sum of these scores: 4 ⅓.

The document quantizer 90, as described above, provides a measure of the relevance of a document to a list of query-words. However, because this measure is based on the overall document, it can overlook relevant material scattered throughout a very large document. In order to avoid overlooking documents of this type, it is useful to supplement this measure of overall document relevance with measures of the relevance of specific sentences within the document. It is these measures, collectively referred to as "sentence similarity," that are calculated by the sentence quantizer 60 of the invention.

The sentence quantizer 60 provides two distinct measures of sentence similarity: a position-independent sentence similarity and a position-dependent sentence similarity, also referred to as a weighted average.

The position-independent sentence similarity represents how closely the words in a particular sentence match the specified query-words. However, this measure is sensitive only to the distribution of words in the particular sentence. It is not sensitive to the position of that sentence within the document. As a result, a sentence that closely matches the query-words receives the same position-independent sentence similarity score whether that sentence is near the beginning of the document or in the middle of the document.

It is apparent however that the location of a sentence within a document is potentially indicative of the relevance of that document. For example, a sentence near the beginning of the document is likely to be part of an introduction that summarizes the content of the document. Similarly, a sentence near the end of the document is likely to recapitulate the main points of that document. As a result, it is useful to weight a sentence located at the extremes of the document more heavily than the same sentence located near the middle of the document. It is for this reason that the sentence quantizer 60 also calculates a position-dependent sentence similarity, or weighted average.

In order to calculate both the position-independent sentence similarity and the position-dependent sentence similarity for a particular sentence, the sentence quantizer 60 sums the inverse document frequencies for all the distinct query-words in the query. This sum, referred to as the "query weight" nq, is given by the summation:

$$nq = \sum_{i=0}^{\#Q} IDF_i \qquad (1)$$

where $^{\#}Q$ is the number of distinct query-words in the user-query and $IDF_i$ is the inverse document frequency of the $i^{th}$ query-word, which is defined as:

$$IDF_i = \log_2 \frac{N}{f_i} \qquad (2)$$

where N is the number of documents in the authoritative database and $f_i$ is the number of documents including at least one occurrence of the query-word.

For each sentence $S_i$ in the document d, the sentence quantizer 60 then calculates the sum $$nc_{d,i} = \sum_{t \in S_i} \begin{cases} IDF_t, & \text{if } t \text{ is an original query-word} \\ \dfrac{IDF_t}{SF}, & \text{if } t \text{ is a derivative query-word} \end{cases} \quad (3)$$

where the sum is over only those query-words that are present in the particular sentence $S_i$.

From these quantities, the sentence quantizer 60 calculates a position-independent sentence similarity using the following formula:

$$Similarity_{d,i} = \frac{nc_{d,i}}{\sqrt{nq \cdot \left[ \dfrac{(\#W(S_i) - \#Q(S_i)) \cdot nq}{\#Q} + nc_{d,i} \right]}} \quad (4)$$

where ™$W(S_i)$ is the number of distinct words in sentence $S_i$, ™$Q(S_i)$ is the number of distinct query-words in sentence $S_i$, and ™$Q$ is the number of distinct query-words in the user-query.

It is apparent that if a particular sentence $S_i$ contains no query-words at all, then the sum $nc_{d,i}$ has no terms. As a result, the position-independent sentence similarity for the particular sentence $S_i$ is zero. Conversely, if the particular sentence $S_i$ contains nothing but query-words, then the position-independent sentence similarity for that particular sentence $S_i$ reaches a maximum of 1.

The sentence quantizer 60 then determines that sentence in the document which most closely matches the user-query by identifying the sentence having the highest position-independent sentence similarity in the document.

The sentence quantizer 60 uses the position-independent spatial similarity calculated above to generate the position-dependent spatial similarity using the following formula:

$$Weighted\_Average_d = \sum_{\{i \exists t \in S_i\}} \frac{Similarity_{d,i}}{\min(i, \#S + 1 - i)} \quad (5)$$

where ™$S$ is the number of sentences in the document and the sum is over all sentences in the document that include at least one query-word.

Note that the denominator reaches a minimum for sentences located at the ends of the document and reaches a maximum in the middle of the document. As a result, the contribution of a sentence to the position-dependent sentence similarity is greater when the sentence is located at the ends of the document. It will be apparent to one of skill in the art that profiles other than the linear profile shown above can be used to assign a weight to a sentence on the basis of its position within the document.

The data analyzer 95 uses the outputs of the query quantizer 30, the sentence quantizer 60, and the document quantizer 90 to calculate a relevance score for each candidate document parsed by the document parser 80 and to rank those candidate documents on the basis of this relevance score.

The ranking process begins with the data analyzer 95 first discarding those candidate documents that fail to meet a threshold of similarity. To do so, the data analyzer 95 identifies the document having a sentence that has a position-independent sentence similarity higher than any other sentence not only in the candidate document in which it is found but in all other candidate documents as well. This highest position-independent sentence similarity score is then used as a similarity threshold to delete from the list of candidate documents those documents that are too dissimilar from the most similar candidate document to be worth considering further.

In the preferred embodiment, this similarity is set to be a fractional part of this highest position-independent sentence similarity in the entire collection of candidate documents. When the authoritative database 21 includes a collection of documents associated with a variety of subject matter, the optimum fractional part has been empirically determined to be 0.6. However, this fraction may be different when the authoritative database 21 contains a high concentration of documents in associated with particular subject matter.

A candidate document is considered for further ranking by the data analyzer 95 only if the sum of its position-dependent sentence similarity and the position-independent sentence similarity of the sentence having the highest position-independent sentence similarity in that document is in excess of the similarity threshold as described above.

In the next step, the data analyzer 95 assigns an overall similarity score to each candidate document that passed the threshold value of similarity. This score is essentially the same quantity used in the first step but weighted by a factor that taken into account the query-word-conductance and the document-conductance. The overall similarity is given by the following formula:

$$S_{q,d} = (Best\_Similarity_d + Weighted\_Average_d) \cdot \sqrt{\frac{\sum_{t \in Q} IDF_t \cdot C_{q,t} \cdot C_{d,t}}{\log_2(\#S + 2)}} \quad (6)$$

where the sum is taken over all query-words, $IDF_i$ is the inverse document frequency for the $i^{th}$ query-word, $C_{q,t}$ is the query-conductance from the query quantizer 20, $C_{d,t}$ is the document-conductance from the document quantizer 30, and ™$S$ is the number of sentences in the document. The addition of a positive number to the argument of the log function is necessary to prevent division by zero when the document consists of only a single sentence. Any positive number can be used to accomplish this task, however the choice of 2 appears to minimize distortion of the search results.

The data analyzer 95 then ranks the candidate documents in the order of their overall similarity to the search query and presents the list of documents to the user.

It is apparent that the use of an authoritative database 21 as disclosed herein improves the overall similarity of those documents presented to the user in response to a user-query by providing an absolute standard against which the relevance, or similarity, of documents retrieved from the public database 22 can be assessed. The authoritative database 21, in effect, provides a similarity floor. If there are no documents in the public database 22 that are sufficiently relevant to the user-query, the list of search results will include only candidate documents retrieved from the authoritative database 21. As a result, the user need only examine documents of known reliability and need not waste time examining a large number of irrelevant documents. Conversely, if the subject matter of the query is outside the scope of the authoritative database 21, the search results will include only documents from the public database 22. These documents will likewise be filtered so that the user need only examine those documents which are clearly relevant to the user-query. In cases between these two extremes, the search results will include entries from both the public database 22 and the authoritative database 21 ranked in the order of similarity to the user-query.

Because the method of the invention takes into account the distribution of query-words in a document, a candidate document will receive a higher similarity score when the document includes a large concentration, or clustering, of query-words. This renders the method of the invention relatively immune to isolated and sporadic occurrences of query-words and thereby eliminates many irrelevant documents from the search results. This improvement does not depend, for its performance, on the existence of an authoritative database and a public database. The exploitation of query-word clustering to identify relevant documents in a database improves the quality of the search results obtained by searching the public or authoritative databases separately and without the interaction of search results from these two databases.

The optional position-dependent sentence similarity computation further enhances the quality of the search results by recognizing the fact that clusters of query-words near the beginning and the end of the document are likely to be more important than clusters of query-words located near the middle of the document. The inclusion of this feature and the method of the invention thus enhances the overall quality of the search results by taking into account the context in which the query-word cluster occurs.

Having described my invention and a preferred embodiment thereof, what is claimed as new and secured by Letters Patent is:

1. A method for ranking a plurality of candidate documents on the basis of the similarity each of the plurality of candidate documents to a user-query, said method comprising the steps of parsing the user-query, thereby generating a query-word and a distribution of the query-word in the user-query, assessing an importance of the query-word on the basis of
      the frequency with which the query-word occurs in the plurality of candidate documents, and
      the distribution of the query-word in the user-query, evaluating the similarity of a candidate document to the user-query on the basis of a distribution of the query-word in the candidate document, the candidate document having at least one candidate document sentence, evaluating the similarity of the at least one candidate document sentence to the user-query on the basis of the frequency with which the query-word occurs in the at least one candidate document sentence, ranking the candidate document relative to the plurality of candidate documents on the basis of the similarity of the candidate document to the user-query and the similarity of the at least one candidate document sentence to the user-query.

2. The method of claim 1 further comprising the step of evaluating the similarity of the at-least-one-candidate-document-sentence to the user-query on the basis of a location of the at-least-one-candidate-document-sentence relative to the public document.

3. The method of claim 1 further comprising the step of generating a derivative query-word, the derivative query-word being selected on the basis of an association with the query-word.

4. The method of claim 1 wherein the step of assessing the importance of the query-word comprises the steps of determining the overall concentration of the query-word in the plurality of candidate documents, determining the concentration of the query-word in the user-query, determining a query-conductance indicative of the importance of the query-word, the query-conductance varying with the concentration of the query-word in the user-query and varying inversely with the overall concentration of the query-word in the plurality of candidate documents.

5. The method of claim 1 wherein the step of evaluating the similarity of the candidate document to the user-query comprises the steps of determining the concentration of the query-word in the candidate document, assigning a document-conductance to the candidate document, the document-conductance being selected to vary with the concentration of the query-word in the candidate document.

6. The method of claim 1 wherein the step of evaluating the similarity of the at-least-one-candidate-document-sentence to the user-query comprises the steps of determining the overall concentration of the query-word in the plurality of candidate documents, determining the concentration of the query-word in the at-least-one-candidate-document-sentence assigning a position-independent sentence similarity to the at-least-one-candidate-document-sentence, the position-independent sentence similarity being responsive to the ratio of
      the overall concentration of the query-word in the plurality of candidate documents to
      the concentration of the query-word in the at-least-one-candidate-document-sentence.

7. A computer-readable medium containing software for ranking a plurality of candidate documents on the basis of the similarity each of the plurality of candidate documents to a user-query, said software comprising instruction for executing the steps of parsing the user-query, thereby generating a query-word and a distribution of the query-word in the user-query, assessing an importance of the query-word on the basis of
      the frequency with which the query-word occurs in the plurality of candidate documents, and
      the distribution of the query-word in the user-query, evaluating the similarity of a candidate document to the user-query on the basis of a distribution of the query-word in the candidate document, the candidate document having at least one candidate document sentence, evaluating the similarity of the at least one candidate document sentence to the user-query on the basis of the frequency with which the query-word occurs in the at least one candidate document sentence, ranking the candidate document relative to the plurality of candidate documents on the basis of the similarity of the candidate document to the user-query and the similarity of the at least one candidate document sentence to the user-query.

8. The computer readable medium of claim 7 wherein the software further comprises instructions for executing the step of evaluating the similarity of the at-least-one-candidate-document-sentence to the user-query on the basis of a location of the at-least-one-candidate-document-sentence relative to the public document.

9. The computer readable medium of claim 7 wherein the software further comprises instructions for executing the step of generating a derivative query-word, the derivative query-word being selected on the basis of an association with the query-word.

10. The computer readable medium of claim 7 wherein the software further comprises instructions for executing the step of assessing an importance of the derivative query-word on the basis of
the frequency with which the derivative query-word occurs in the plurality of candidate documents, and
the distribution of the derivative query-word in the user-query.

11. The computer readable medium of claim 10 wherein the software further comprises instructions for executing the step of diminishing the importance of the derivative query-word relative to the importance of the query-word.

12. The computer readable medium of claim 7 wherein the software for executing the step of assessing the importance of the query-word comprises instructions for executing the steps of determining the overall concentration of the query-word in the plurality of candidate documents,
determining the concentration of the query-word in the user-query,
determining a query-conductance indicative of the importance of the query-word, the query-conductance varying with the concentration of the query-word in the user-query and varying inversely with the overall concentration of the query-word in the plurality of candidate documents.

13. The computer readable medium of claim 7 wherein the software for executing the step of evaluating the similarity of the candidate document to the user-query comprises software instructions for executing the steps of determining the concentration of the query-word in the candidate document,
assigning a document-conductance to the candidate document, the document-conductance being selected to vary with the concentration of the query-word in the candidate document.

14. The computer readable medium of claim 7 wherein the software for executing the step of evaluating the similarity of the at-least-one-candidate-document-sentence to the user-query comprises software instruction for executing the steps of determining the overall concentration of the query-word in the plurality of candidate documents,
determining the concentration of the query-word in the at-least-one-candidate-document-sentence
assigning a position-independent sentence similarity to the at-least-one-candidate-document-sentence, the position-independent sentence similarity being responsive to the ratio of
the overall concentration of the query-word in the plurality of candidate documents to
the concentration of the query-word in the at-least-one-candidate-document-sentence.

15. The computer-readable medium of claim 7 wherein the software further comprises instructions for executing the step of retrieving the at-least-one authoritative document from a local storage device.

16. The computer-readable medium of claim 7 wherein the software further comprises instructions for executing the step of retrieving the at-least one authoritative document from a server on a network.

17. The computer-readable medium of claim 16 wherein the software further comprises instructions for selecting the network to be a corporate-wide network.

18. The computer-readable medium of claim 16 wherein the software further comprises instructions for selecting the network to be a global computer network.

19. The computer-readable medium claim 7 wherein the software further comprises instructions for executing the step of selecting the authoritative database from a plurality of authoritative databases.

20. A computer-implemented method for generating a list of candidate documents, said method comprising the steps of evaluating, on the basis of a search query, a relevance of an authoritative document selected from an authoritative database,
evaluating, on the basis of the search query, a relevance of a public document from a public database, and
including the public document in the list of candidate documents if the relevance of the public document exceeds a relevance threshold selected on the basis of the relevance of the authoritative document.

21. The method of claim 20 wherein the first evaluating step comprises the steps of parsing the search query, thereby retrieving a query word and a distribution of the query word in the user-query, and
assessing an importance of the query word on the basis of the authoritative document.

22. The method of claim 21 wherein the assessing step comprises the step of assessing the importance of the query word on the basis of the distribution of query words in the search query and the frequency with which the query word occurs in the public document.

23. The method of claim 21 wherein the step of evaluating a relevance of a public document comprises the step of evaluating the relevance of the public document on the basis of the distribution of the query word in the public document.

24. The method of claim 23 wherein the public document includes at least one sentence and the step of evaluating the relevance of the public document on the basis of the distribution of the query word comprises the step of evaluating the frequency with which the query word occurs in the at least one sentence.

25. The method of claim 21 wherein the step of assessing the importance of the query word comprises the steps of determining an overall concentration in the authoritative database of the query-word,
determining a concentration of the query-word in the search-query, and
determining a query-conductance indicative of the importance of the query-word, the query-conductance varying with the concentration of the query-word in the search-query and varying inversely with the overall concentration of the query-word in the authoritative database.

26. The method of claim 20 wherein the step of evaluating the relevance of the authoritative document to the search-query comprises the steps of determining the concentration in the authoritative document of the query-word,
assigning a document-conductance to the authoritative document, the document-conductance being selected to vary with the concentration of the query-word in the authoritative document.

27. The method of claim 20 wherein the step of evaluating the similarity of the public document to the search-query comprises the steps of determining the concentration of the query-word in the public document, assigning a document-conductance to the public document, the document-conductance being selected to vary with the concentration of the query-word in the public document.

28. The method of claim 20 wherein the authoritative document includes at-least-one-authoritative-document sentence and the step of evaluating the relevance of the authoritative document to the search-query comprises the steps of determining the overall concentration of the query-word in the authoritative database, determining the concentration of the query-word in the at-least-one-authoritative-document sentence assigning a position-independent sentence similarity to the at-least-one-authoritative-document sentence, the position-independent sentence similarity being responsive to the ratio of the overall concentration of the query-word in the authoritative database to the concentration of the query-word in the at-least-one-authoritative-document sentence.

29. The method of claim 20 wherein the public document includes at-least-one-public-document sentence and the step of evaluating the relevance of a public document to the user-query comprises the steps of determining the overall concentration of the query-word in the authoritative database, determining the concentration of the query-word in the at-least-one-public-document sentence assigning a position-independent sentence similarity to the at-least-one-public-document sentence, the position-independent sentence similarity being responsive to the ratio of the overall concentration of the query-word in the public database to the concentration of the query-word in the at-least-one-public-document-sentence.

30. The method of claim 20 further comprising the step of retrieving the authoritative document from a local storage device.

31. The method of claim 20 further comprising the step of retrieving the authoritative document from a network.

32. The method of claim 31 further comprising the step of selecting the network to be a corporate-wide network.

33. The method of claim 31 further comprising the step of selecting the network to be a global computer network.

34. A computer-readable medium containing software for generating a list of candidate documents, the software comprising instructions for executing the steps of evaluating, on the basis of a search query, a relevance of an authoritative document selected from an authoritative database, evaluating, on the basis of the search query, a relevance of a public document, and including the public document in the list of candidate documents if the relevance of the public document exceeds a relevance threshold selected on the basis of the relevance of the authoritative document.

35. The computer-readable medium of claim 34 wherein the instructions for executing the first evaluating step comprise instructions for executing the steps of parsing the search query, thereby retrieving a query word and a distribution of the query word in the user-query, and assessing an importance of the query word on the basis of the authoritative document.

36. The computer-readable medium of claim 35 wherein the instructions for executing the assessing step comprise instructions for executing the step of assessing the importance of the query word on the basis of the distribution of query words in the search query and the frequency with which the query word occurs in the public document.

37. The computer-readable medium of claim 35 wherein the instructions for executing the step of evaluating a relevance of a public document comprise instructions for executing the step of evaluating the relevance of the public document on the basis of the distribution of the query word in the public document.

38. The computer-readable medium of claim 37 wherein the public document includes at least one sentence and the instructions for executing the step of evaluating the relevance of the public document on the basis of the distribution of the query word comprise instructions for executing the step of evaluating the frequency with which the query word occurs in the at least one sentence.

39. The computer-readable medium of claim 35 wherein the instructions for executing the step of assessing the importance of the query word comprise instructions for executing the steps of determining an overall concentration in the authoritative database of the query-word, determining a concentration of the query-word in the search-query, and determining a query-conductance indicative of the importance of the query-word, the query-conductance varying with the concentration of the query-word in the search-query and varying inversely with the overall concentration of the query-word in the authoritative database.

40. The computer-readable medium of claim 34 wherein the instructions for executing the step of evaluating the relevance of the authoritative document to the search-query comprise instructions for executing the steps of determining the concentration in the authoritative document of the query-word, assigning a document-conductance to the authoritative document, the document-conductance being selected to vary with the concentration of the query-word in the authoritative document.

41. The computer-readable medium of claim 34 wherein the instructions for executing the step of evaluating the similarity of the public document to the search-query comprise instructions for executing the steps of determining the concentration of the query-word in the public document, assigning a document-conductance to the public document, the document-conductance being selected to vary with the concentration of the query-word in the public document.

42. The computer-readable medium of claim 34 wherein the authoritative document includes at least one authoritative-document sentence and said instructions for executing the step of evaluating the relevance of the authoritative document to the search-query comprise instructions for executing the steps of determining the overall concentration of the query-word in the authoritative database, determining the concentration of the query-word in the at-least-one-authoritative-document sentence assigning a position-independent sentence similarity to the at-least-one-authoritative-document sentence, the position-independent sentence similarity being responsive to the ratio of the overall concentration of the query-word in the authoritative database to the concentration of the query-word in the at-least-one-authoritative-document sentence.

43. The computer-readable medium of claim 34 wherein the public document includes at least one public-document sentence and the instructions for executing the step of evaluating the relevance of a public document to the user-query comprise instructions for executing the steps of determining the overall concentration of the query-word in the authoritative database, determining the concentration of the query-word in the at-least-one-public-document sentence assigning a position-independent sentence similarity to the at-least-one-public-document sentence, the position-independent sentence similarity being responsive to the ratio of the overall concentration of the query-word in the public database to the concentration of the query-word in the at-least-one-public-document-sentence.

44. The computer-readable medium of claim 34 further comprising instructions for executing the step of retrieving the authoritative document from a local storage device.

45. The computer-readable medium of claim 34 further comprising instructions for executing the step of retrieving the authoritative document from a network.

46. The computer-readable medium of claim 45 further comprising instructions for executing the step of selecting the network to be a corporate-wide network.

47. The computer-readable medium of claim 45 further comprising instructions for executing the step of selecting the network to be a global computer network.

\* \* \* \* \*